United States Patent
Ooguchi et al.

(10) Patent No.: US 7,143,683 B2
(45) Date of Patent: Dec. 5, 2006

(54) HYDRAULIC POWER STEERING APPARATUS

(75) Inventors: Katsuyuki Ooguchi, Kashiwara (JP); Takashi Oohata, Kitakatsuragi-gun (JP); Yoshimi Kotake, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/938,054

(22) Filed: Sep. 10, 2004

(65) Prior Publication Data
US 2005/0060994 A1 Mar. 24, 2005

(30) Foreign Application Priority Data
Sep. 24, 2003 (JP) .............................. 2003-331805

(51) Int. Cl.
*F15B 9/10* (2006.01)
(52) U.S. Cl. ....................................... 91/375 A; 91/386
(58) Field of Classification Search .............. 91/375 R, 91/375 A, 386
See application file for complete search history.

(56) References Cited

U.S. PATENT DOCUMENTS

| 4,796,715 A | | 1/1989 | Futaba et al. | |
|---|---|---|---|---|
| 5,058,696 A | * | 10/1991 | Prebay et al. | 91/375 R |
| 5,070,957 A | * | 12/1991 | Harkrader et al. | 91/375 R |
| 5,190,119 A | * | 3/1993 | Nomura et al. | 91/375 A |
| 5,233,906 A | | 8/1993 | Bishop et al. | |
| 5,452,642 A | * | 9/1995 | Dymond | 91/375 R |
| 5,575,193 A | * | 11/1996 | Bareis et al. | 91/375 A |

FOREIGN PATENT DOCUMENTS

| EP | 0818380 | 1/1998 |
|---|---|---|
| JP | 2509939 | 6/1996 |

* cited by examiner

*Primary Examiner*—Edward K. Look
*Assistant Examiner*—Michael Leslie
(74) *Attorney, Agent, or Firm*—Jordan and Hamburg LLP

(57) ABSTRACT

A control valve controls hydraulic pressure of oil supplied to a hydraulic actuator for generating steering assist power, based on elastic relative rotation between input and output shafts. A restricting device restricts relative rotation between input and output shafts based on a driving condition of the vehicle, and adjusts the hydraulic pressure for pressing the input shaft via a plunger inserted into a guide bore formed in the output shaft, based on the driving condition of the vehicle by the hydraulic pressure adjustment mechanism. The plunger is guided by the inner circumference of the guide bore along the direction that the plunger approaches to and goes away from the output shaft when the input and output shafts relatively rotate. A friction reducing element is interposed between the inner circumference of the guide bore and the outer circumference of the plunger.

2 Claims, 13 Drawing Sheets

Prior Art

HYDRAULIC POWER STEERING APPARATUS

FIELD OF THE INVENTION

The present invention relates to a hydraulic power steering apparatus capable of changing the steering assist characteristics in accordance with a driving condition, such as speed of the vehicle.

DESCRIPTION OF THE RELATED ART

In a hydraulic power steering apparatus, which comprises a control valve controlling hydraulic pressure of the oil supplied to a hydraulic actuator for generating steering assist power in accordance with the amount of elastic relative rotation between an input shaft and an output shaft corresponding to a steering torque, the steering assist characteristics can be changed in accordance with the steering torque. There is this type of a hydraulic power steering apparatus, in which a plunger is inserted into a guide bore formed in the output shaft, and hydraulic pressure for pressing the input shaft through the plunger is adjusted in accordance with a driving condition of the vehicle (Japanese Utility Model Registration No. 2509939). As the result, the steering assist power can be changed by restricting the amount of relative rotation between the input shaft and the output shaft in accordance with the driving condition such as speed of the vehicle, thereby improving the running stability at a high vehicle speed and the response to the steering operation at a low vehicle speed.

SUMMARY OF THE INVENTION

In the above conventional hydraulic power steering apparatus, as shown in FIG. 13, the hysteresis H in the variation of the hydraulic pressure for generating steering assist power with respect to the variation of the steering torque is large, so that the feel of steering deteriorates. The present invention has an object of providing a hydraulic power steering apparatus which can solve such a problem.

A hydraulic power steering apparatus according to the present invention comprises an input shaft; an output shaft connected to the input shaft so as to be capable of elastic relative rotation in accordance with steering torque; a hydraulic actuator for generating steering assist power; a control valve for controlling hydraulic pressure of the oil supplied to the hydraulic actuator in accordance with the amount of relative rotation between the input shaft and the output shaft; a restricting device for restricting the relative rotation between the input shaft and the output shaft in accordance with a driving condition of the vehicle; the restricting device having a guide bore formed in one of the input shaft and the output shaft, a plunger inserted into the guide bore so as to be capable of reciprocal movement toward the direction in which the plunger approaches to and goes away from the other of the input shaft and the output shaft, and a hydraulic pressure adjustment mechanism for adjusting the hydraulic pressure for pressing the other of the input shaft and the output shaft via the plunger in accordance with the driving condition of the vehicle; and the plunger being guided by the inner circumference of the guide bore to the reciprocal movement direction when the input shaft and the output shaft rotate relatively; wherein a friction reducing element is interposed between the inner circumference of the guide bore and the outer circumference of the plunger.

The inventors of the present invention have discovered that the reason why the hysteresis in the variation of the hydraulic pressure for generating steering assist power with respect to the variation of the steering torque becomes large in a conventional hydraulic power steering apparatus is because the movement of the plunger is inhibited based on the friction between the inner circumference of the guide bore and the outer circumference of the plunger. Therefore, the inventors came up with an idea about reducing the hysteresis by interposing a friction reducing element between the inner circumference of the guide bore and the outer circumference of the plunger. The plunger is guided to reciprocal movement direction by the inner circumference of the guide bore via the friction reducing element, thus the plunger can move smoothly, whereby, as shown in FIG. 12, the hysteresis H in the variation of the hydraulic pressure of the oil for generating steering assist power with respect to the variation of the steering torque can be reduced.

Preferably, the friction reducing element is spheres rolling between the inner circumference of the guide bore and the outer circumference of the plunger. Thus, the friction between the inner circumference of the guide bore and the outer circumference of the plunger is rolling friction, and is reduced. In this case, in at least one of the inner circumference of the guide bore and the outer circumference of the plunger, it is preferable that three or more rows of raceway grooves are formed along the reciprocal movement direction of the plunger, with spacing in the circumferential direction of the guide bore, and the plural spheres are disposed in each of the raceway grooves. Therefore, the plunger supported by the inner circumference of the guide bore via the spheres can be prevented from tilting to its reciprocal movement direction, and the inner circumference of the guide bore and the outer circumference of the plunger securely come into contact with the spheres without directly contacting with each other. Further, by increasing the number of the spheres, the load on the inner circumference of the guide bore that contacts with each of the spheres can be reduced. Consequently, the surface treatment for hardening the inner circumference of the guide bore can be simplified or eliminated, whereby increase of the cost can be prevented.

The friction reducing element is preferably interposed between the inner circumference of the guide bore and the outer circumference of the plunger, by being coated on or pressed into one of the inner circumference of the guide bore and the outer circumference of the plunger. Thus, the friction between the inner circumference of the guide bore and the outer circumference of the plunger can be reduced more in comparison to the case where both directly contact with each other. Moreover, it takes less amount of work for assemble than the spheres are interposed as the friction reducing element, and also the amount of work for machining can be reduced since it is not necessary to machine the raceway grooves for the spheres. Furthermore, the load on the inner circumference of the guide bore can be reduced, thus the surface treatment for hardening the inner circumference of the guide bore can be simplified or eliminated, whereby increase of the cost can be prevented.

According to the present invention, in the hydraulic power steering apparatus which changes the steering assist power in accordance with a driving condition, such as speed of the vehicle, a good feel of steering can be obtained at a low cost and by a simple structure.

DESCRIPTION OF THE PREFERRED EMBODIMENTS

Figure 1:
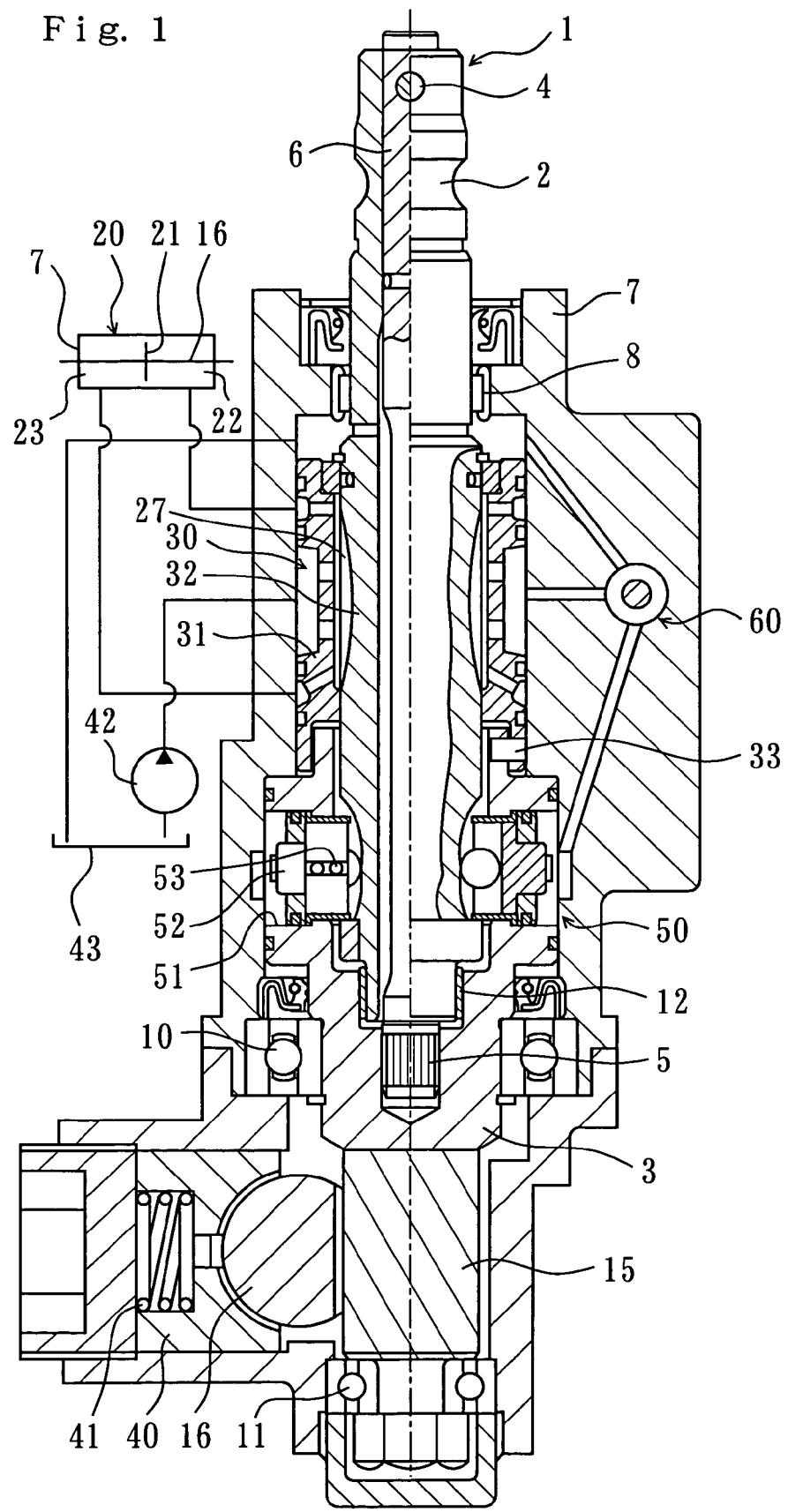
FIG. 1 is a vertical cross sectional view of a hydraulic power steering apparatus of a first embodiment of the present invention.

A rack and pinion type hydraulic power steering apparatus 1 of a first embodiment as shown in FIG. 1 comprises a metallic input shaft 2 connected to the steering wheel (figure omitted) of the vehicle, and a metallic output shaft 3 connected to the input shaft 2 via a torsion bar 6 so as to be capable of elastic relative rotation in accordance with steering torque. To be more precise, the torsion bar 6 is connected to the input shaft 2 via a pin 4 and is connected to the output shaft 3 through serrations 5, so the input shaft 2 and output shaft 3 are capable of elastic relative rotation coaxially. One end side of the input shaft 2 is supported by a housing 7 via a bearing 8. The other end side of the input shaft 2 is inserted into a recess formed in an end portion of the output shaft 3 and is supported by the inner circumference of the recess via a bushing 12. The output shaft 3 is rotatably supported by the housing 7 through bearings 10 and 11. A pinion 15 is formed integrally with the output shaft 3, and the vehicle wheels (figure omitted) are connected to a rack 16 that engages with the pinion 15. Accordingly, when the rotation of the input shaft 2 caused by steering operation is transmitted to the pinion 15 via the torsion bar 6, the rack 16 is moved in a vehicle width direction by the rotation of the pinion 15, and the steering angle of the vehicle changes due to the movement of the rack 16. A support yoke 40 supporting the rack 16 is pressed toward the rack 16 by the elastic force of a spring 41.

A hydraulic cylinder 20 is provided as a hydraulic actuator for generating steering assist power. The hydraulic cylinder 20 comprises a cylinder tube integral with the housing 7 and a piston 21 integrated with the rack 16, in which hydraulic chambers 22 and 23 partitioned by the piston 21 are formed within the cylinder tube.

Figure 2:
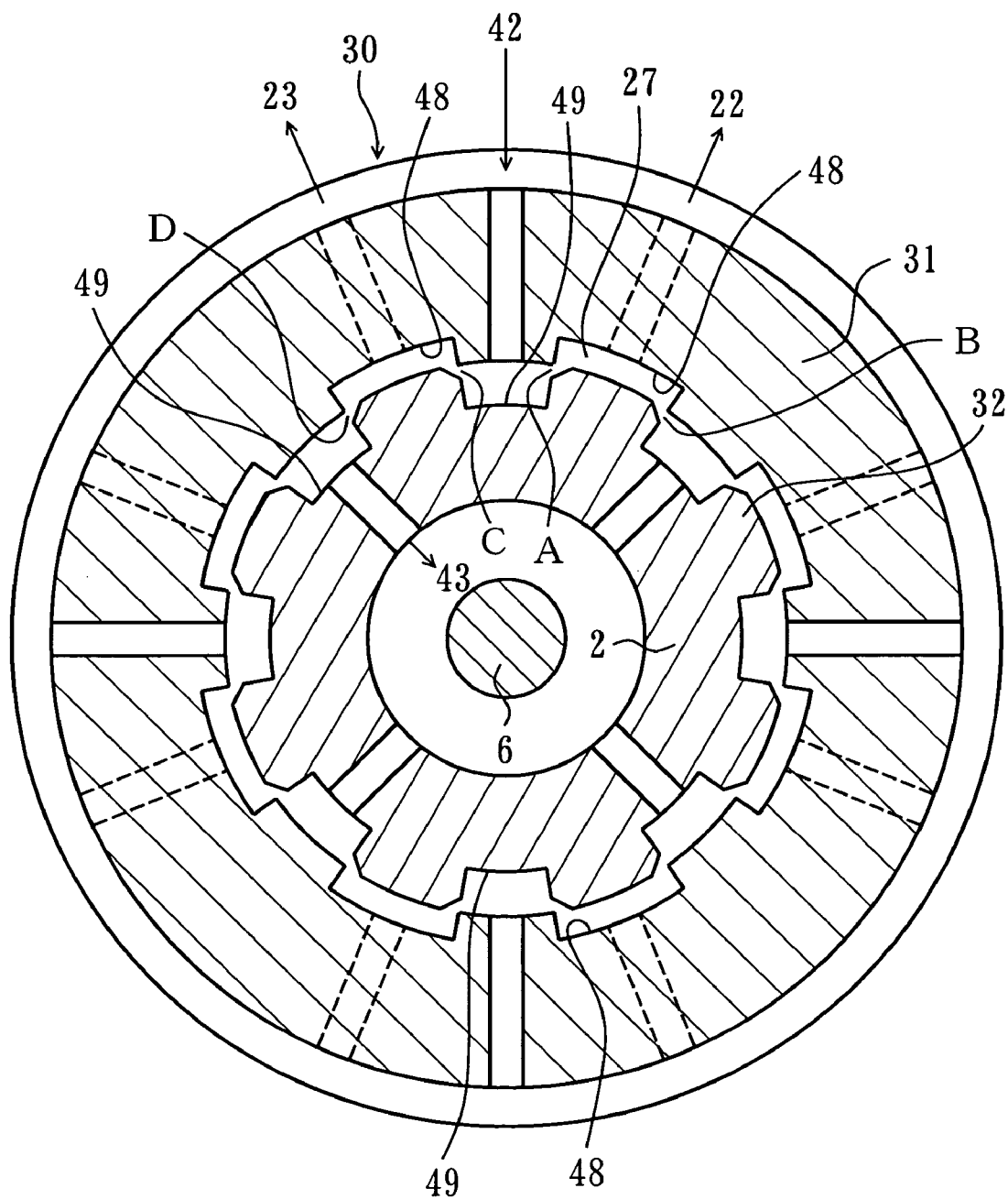
FIG. 2 is a horizontal cross sectional view of a control valve in the hydraulic power steering apparatus of the first embodiment of the present invention.
Figure 3:
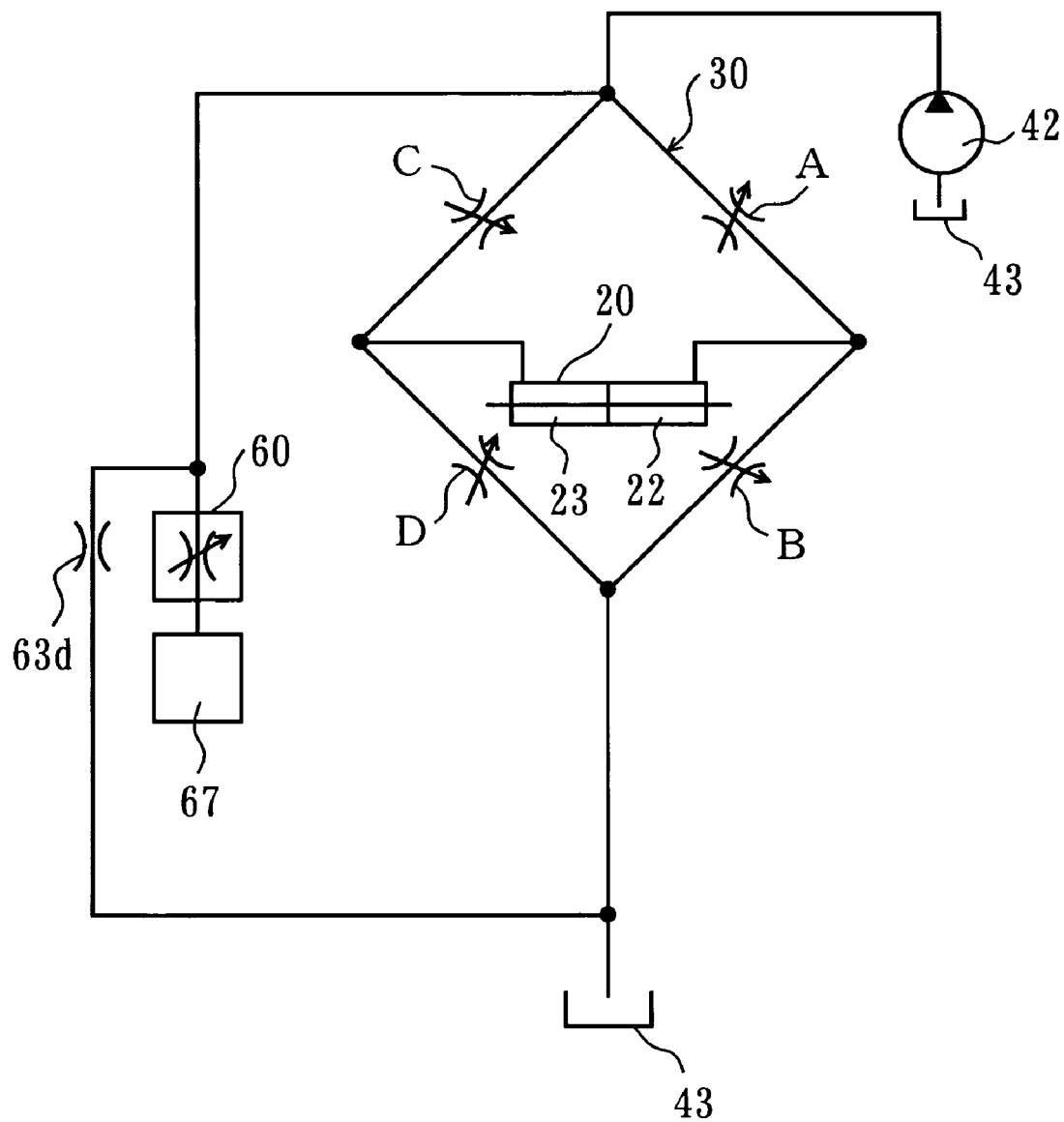
FIG. 3 is a diagram of a hydraulic pressure circuit in the hydraulic power steering apparatus of the first embodiment of the present invention.

There is provided a rotary type hydraulic pressure control valve 30 for controlling hydraulic pressure of the oil supplied to the hydraulic cylinder 20, in accordance with the amount of relative rotation between the input shaft 2 and the output shaft 3. The control valve 30 comprises a cylindrical first valve member 31 that is rotatably inserted into the housing 7, and a second valve member 32 that is inserted into the first valve member 31 so as to be capable of relative rotation coaxially. The first valve member 31 is connected to the output shaft 3 via a pin 33 so as to rotate simultaneously and coaxially with the output shaft 3. The second valve member 32 is integrally formed on the outer circumference of the input shaft 2 and thereby rotates simultaneously and coaxially with the input shaft 2. A port connected to a pump 42 for discharging pressure oil, a port connected to a tank 43, a port connected to one of the hydraulic chambers, i.e., the hydraulic chamber 22, of the hydraulic cylinder 20, and a port connected to the other hydraulic chamber, i.e., the hydraulic chamber 23 are provided in the housing 7, each port communicating with each other via a path 27 located between the first valve member 31 and the second valve member 32. The degree of opening of throttle portions in the path 27 changes in accordance with the amount of relative rotation between the input and output shafts 2 and 3. As shown in FIG. 2, for example, in the control valve 30, throttle portions A, B, C and D are provided between the axial edges of the first grooves 48 in the inner circumference of the first valve member 31 and the axial edges of the second grooves 49 in the outer circumference of the second valve member 32, the first grooves 48 communicated to the hydraulic chamber 22 and the first grooves 48 communicated to the hydraulic chamber 23 are alternately disposed in the circumferential direction, while the second grooves 49 communicated to the pump 42 and the second grooves 49 communicated to the tank 43 via the space between the torsion bar 6 and input shaft 2 are alternately disposed in the circumferential direction. By this configuration, a hydraulic pressure circuit shown in FIG. 3 is created. When steering operation is not performed, each of the throttle portions A, B, C and D is opened and the hydraulic pressure does not rise, thus a steering assist power is not generated. When steering operation to the right is performed, the degrees of opening of the throttle portions A and D increase in accordance with the amount of relative rotation between the input shaft 2 and the output shaft 3, while the degrees of opening of the throttle portions B and C decrease, whereby pressure oil is supplied to the hydraulic chamber 22, and oil is refluxed from the hydraulic chamber 23 to the tank 43, thus the hydraulic cylinder 20 generates a steering assist power to the right direction corresponding to the amount of relative rotation. The degrees of opening of the throttle portions A, B, C and D when steering operation to the left is performed are reversed from the case when steering operation to the right is performed, and thus the hydraulic cylinder 20 generates a steering assist power to the left direction corresponding to the amount of relative rotation.

A restricting device 50 for restricting relative rotation between the input shaft 2 and the output shaft 3 in accordance with a driving condition of the vehicle is provided. The restricting device 50 has plural guide bores 51 formed in the output shaft 3, plungers 52 which are inserted into the different guide bores 51, and a hydraulic pressure adjustment mechanism 60.

Figure 4:
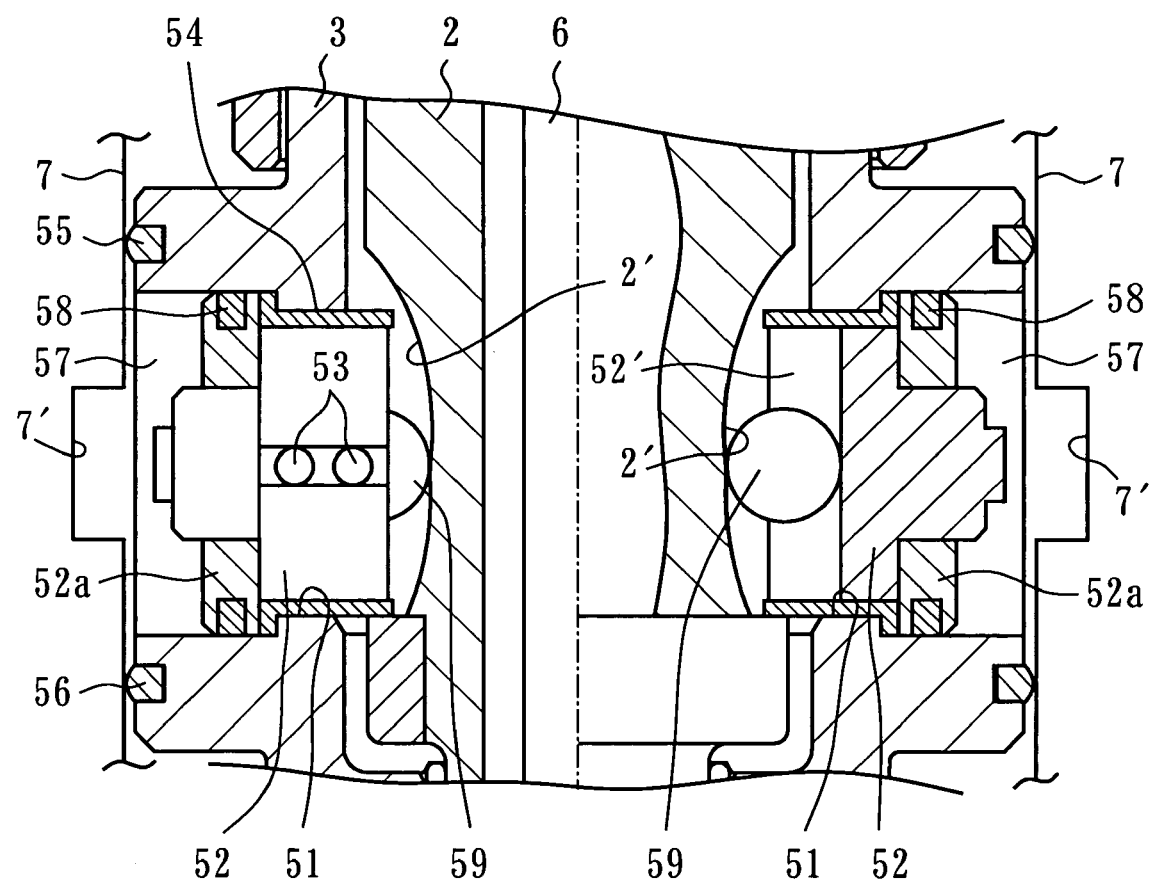
FIG. 4 is a side cross sectional view of an essential part of restricting device in the hydraulic power steering apparatus of the first embodiment of the present invention.
Figure 5:
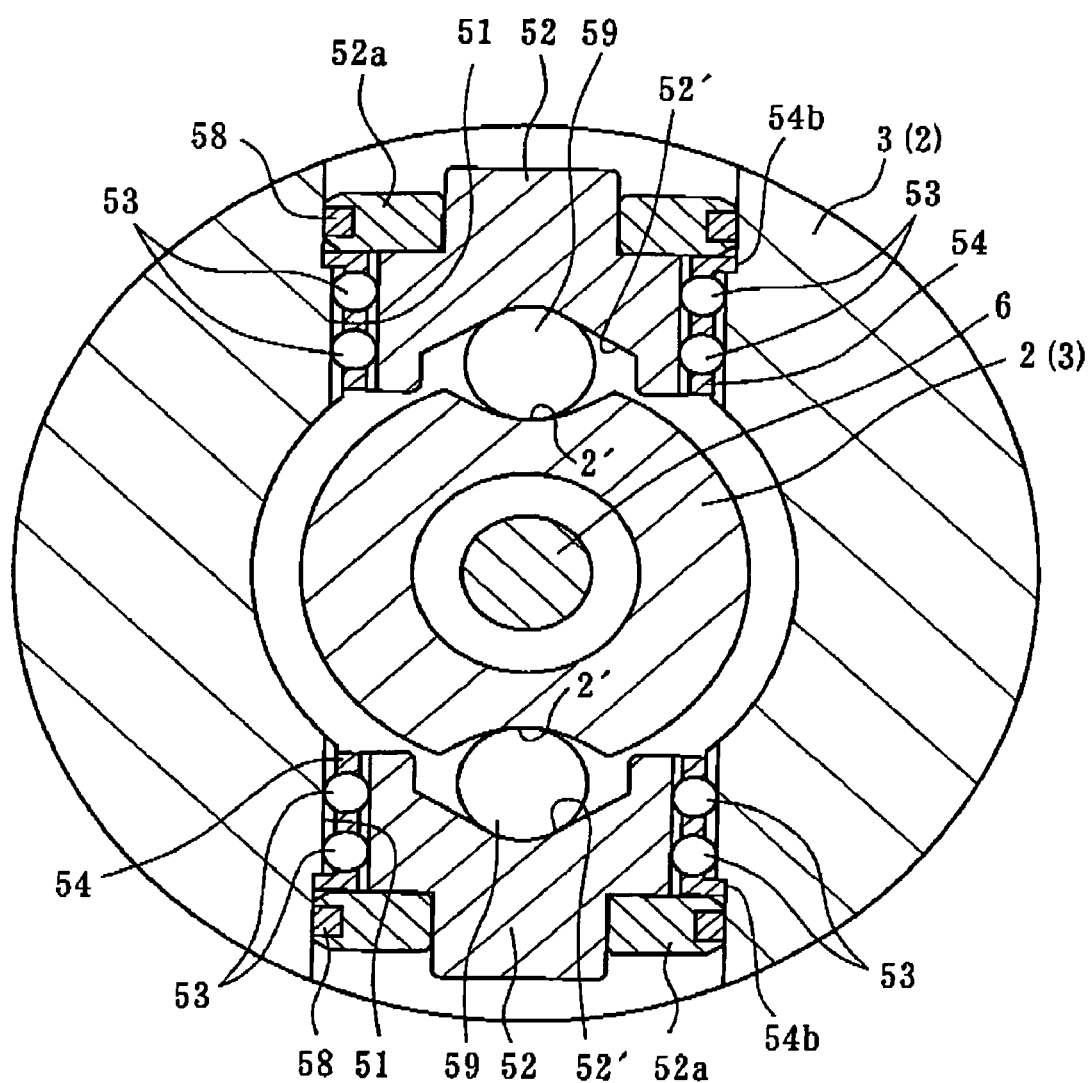
FIG. 5 is a plane cross sectional view of an essential part of the restricting device in the hydraulic power steering apparatus of the first embodiment of the present invention.
Figure 6:
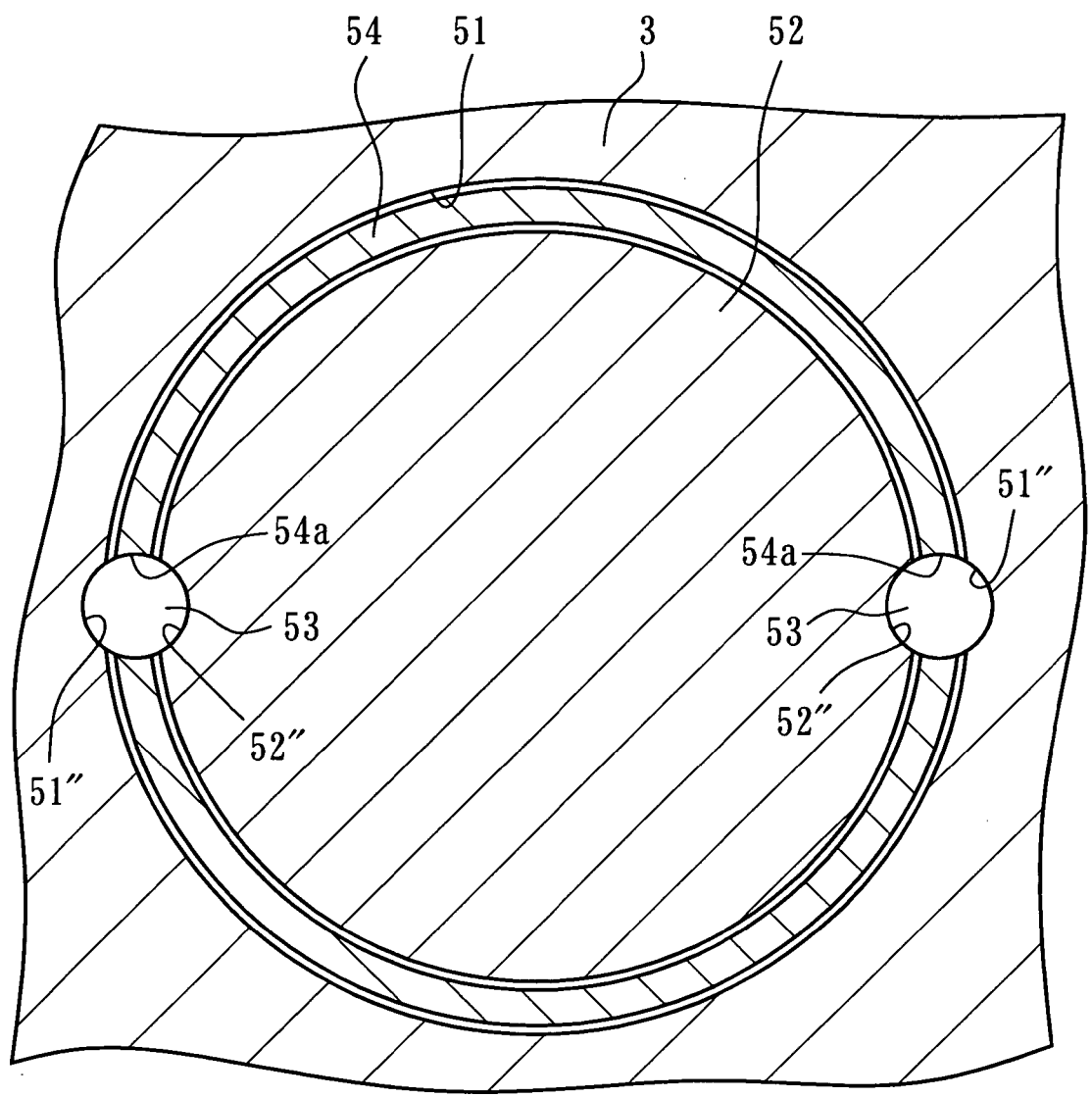
FIG. 6 is a front cross sectional view of an essential part of the restricting device in the hydraulic power steering apparatus of the first embodiment of the present invention.

As shown in FIG. 4 through FIG. 6, one end of each guide bore 51 is opened so as to face to the outer circumference of the input shaft 2 at the inner circumference of the output shaft 3, and the other end of the guide bore 51 is opened at the outer circumference of the output shaft 3. The inner circumference of each guide bore 51 has a shape of cylindrical surface.

Each plunger 52 is capable of reciprocal movement toward the direction in which the plunger 52 approaches to and goes away from the input shaft 2, along the radial direction of the input and output shafts 2 and 3. The outer circumference of each plunger 52 has a shape of cylindrical surface with a step section, and the bore diameter is smaller at the inner side of the output shaft 3 than at the outer side of the output shaft 3. An annular member 52a is fitted to the small diameter portion of each plunger 52 so as to be integrated, and an oil seal 58 is fitted to the outer circumference of the annular member 52a. A spherical metallic pressing member 59 is disposed between one end of each plunger 52 and the input shaft 2. A groove 52' along the axial direction of the input and output shafts 2 and 3 is formed on one end of each plunger 52, such that the depth of the groove 52' becomes deeper toward its center. Grooves 2' which face to the different plungers 52 are formed on the outer circumference of the input shaft 2 along the axial direction of the input and output shafts 2 and 3, such that the depth of each groove 2' becomes deeper toward its center. Each pressing member 59 is sandwiched between the bottom surfaces of the grooves 2' and 52'. In a straight traveling state where the input and output shafts 2 and 3 are not rotating relatively, the central positions of the grooves 2' and 52' are disposed so as to face to each other in the radial direction of the input and output shafts 2 and 3. Therefore, when the input and output shafts 2 and 3 rotate relatively, the positions at which the pressing member 59 contact with the grooves 2' and 52' change, whereby the plunger 52 moves along the radial direction of the input and output shafts 2 and 3.

Plural steel balls (spheres) 53 as the friction reducing element are interposed between the inner circumference of each guide bore 51 and the outer circumference of the large diameter portion of each plunger 52. The plunger 52 is guided to the reciprocal movement direction by the inner circumference of the guide bore 51 via the rolling steel balls 53. In this embodiment, as shown in FIG. 6, two rows of inner raceway grooves 51" are formed along the reciprocal movement direction of the plunger 52 in the inner circumference of the guide bore 51, with spacing at 180-degree interval in the circumferential direction of the guide bore 51, and two rows of outer raceway grooves 53" facing to the inner raceway grooves 51" are formed along the reciprocal movement direction of the plunger 52 in the outer circumference of the plunger 52, with spacing at 180-degree interval in the circumferential direction of the guide bore 51, and the plural steel balls 53 are disposed in the raceway grooves 51" and 52". In this embodiment, the steel balls 53 are held by a cylindrical retainer 54. The retainer 54 is inserted between the inner circumference of the guide bore 51 and the outer circumference of each plunger 52, and holds the steel balls 53 by using the inner circumferences of holding bores 54a. As shown in FIG. 5, on one end of the retainer 54, there is formed a flange 54b which restricts the excess movement of the retainer 54 toward the inside by contacting with the step in the inner circumference of the guide bore 51, whereby the steel balls 53 are prevented from falling. As to the spheres, balls made of other material such as a synthetic resin can be used instead of the steel balls 53.

As shown in FIG. 4, a pair of sealing members 55, 56 with spacing in the axial direction are disposed as oil tight seals between the outer circumference of the output shaft 3 and the inner circumference of the housing 7, and each plunger 52 is disposed between the sealing members 55, 56. Consequently, a hydraulic chamber 57 is provided between the other end of each plunger 52 and the inner circumference of the housing 7, and both chambers 57 are communicated to each other via a circumferential groove 7'. The hydraulic chambers 57 are connected to the pump 42 via the hydraulic pressure adjustment mechanism 60. The hydraulic pressure adjustment mechanism 60 adjusts hydraulic pressure for pressing the input shaft 2 via the plungers 52, in accordance with the driving condition of the vehicle. Accordingly the input shaft 2 is pressed by means of the hydraulic pressure via the plungers 52, and relative rotation between the input shaft 2 and the output shaft 3 can be restricted.

Figure 7:
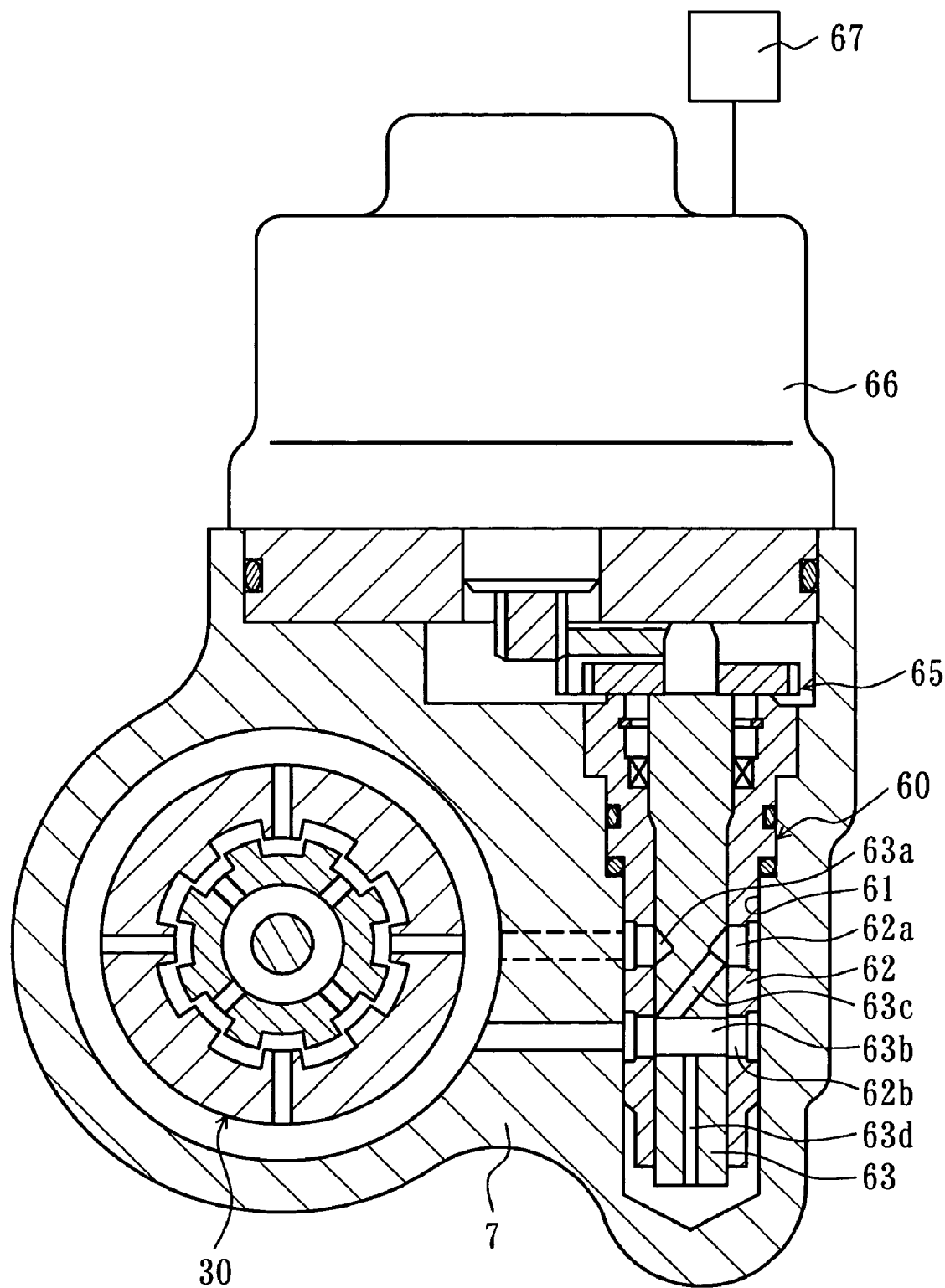
FIG. 7 is a cross sectional view of the hydraulic pressure adjustment mechanism in the hydraulic power steering apparatus of the first embodiment of the present invention.
Figure 8:
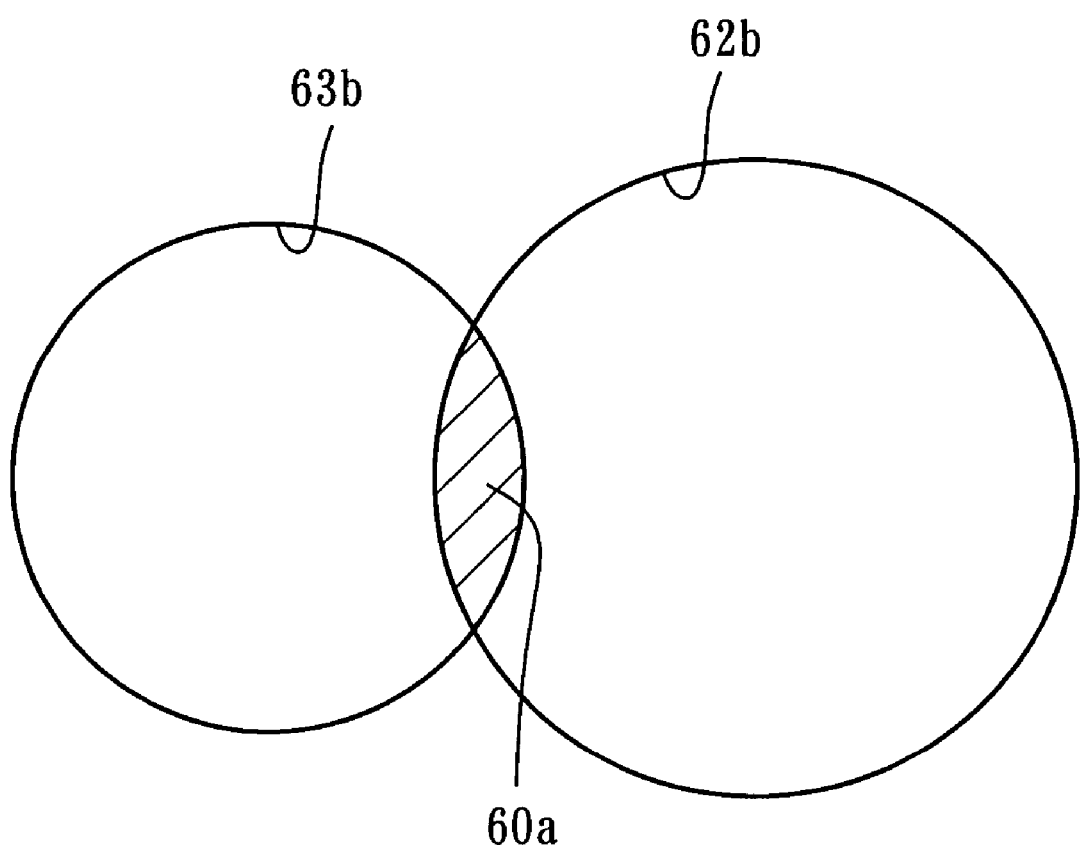
FIG. 8 is an explanatory drawing of an action of the hydraulic pressure adjustment mechanism of the hydraulic power steering apparatus of the first embodiment of the present invention.

As shown in FIG. 7, the hydraulic pressure adjustment mechanism 60 of this embodiment comprises a cylindrical sleeve 62 inserted into a holding bore 61 formed in the housing 7 so as not to rotate relatively, and a spool 63 inserted into the sleeve 62 so as to be able to rotate relatively around its axis. In the sleeve 62, there are formed a pressure oil introducing port 62a communicated to the pump 42 via the control valve 30, and a pressure oil sending port 62b communicated to the hydraulic chambers 57. In the spool 63, there are formed an outer circumferential groove 63a communicated to the pressure oil introducing port 62a, a communication bore 63b disposed in a position where it overlaps with the pressure oil sending port 62b, a pressure oil path 63c connecting the outer circumferential groove 63a with the communication bore 63b, and a throttle path 63d connecting the communication bore 63b to the holding bore 61. Inside of the holding bore 61 is communicated to the tank 43 via a drainage channel. As shown in FIG. 8, the area where the pressure oil sending port 62b of the sleeve 62 and the communication bore 63b of the spool 63 overlap (hatched in the figure) serves as a variable throttle 60a. The degree of opening of the variable throttle 60a changes in accordance with the amount of rotation of the spool 63. The spool 63 is connected to a motor 66 via a reduction mechanism 65, and the amount of rotation of the motor 66 is controlled by a control device 67. A stepping motor, for example, can be used as the motor 66. The control device 67 controls the motor 66 in accordance with the signals from a sensor that detects the driving condition of the vehicle. The control device 67 of this embodiment controls the motor 66 such that the degree of opening of the variable throttle 60a becomes large as the vehicle speed increases, based on the vehicle speed signals from the sensor that detects the vehicle speed as the driving condition of the vehicle. Specifically, when traveling at high speed, the degree of opening of the variable throttle 60a is enlarged to increase the hydraulic pressure for pressing the input shaft 2 via the plungers 52, thereby the restricting force for the relative rotation between the input and output shafts 2 and 3 increases. The degree of opening of the variable throttle 60a becomes small as the vehicle speed decreases, to reduce the hydraulic pressure for pressing the input shaft 2, thereby the restriction force for the relative rotation between the input and output shafts 2 and 3 is moderated. Accordingly, when the vehicle speed is high, the increase of the hydraulic pressure for generating steering assist power that corresponds to the amount of relative rotation between the input shaft 2 and output shaft 3 is restricted to improve running stability, and when the vehicle speed is low, the restriction of the increase of the hydraulic pressure for generating steering assist power is moderated to improve the response to the steering operation.

According to the embodiment described above, when the input and output shafts 2 and 3 rotate relatively, each plunger 52 is guided by the inner circumference of the guide bore 51 to the reciprocal movement direction via the steel balls 53. The friction between the inner circumference of the guide bore 51 and the outer circumference of the plunger 52 is rolling friction, and is thereby reduced. Also, the plunger 52 smoothly moves, and the hysteresis in the variation of the hydraulic pressure of the oil for generating steering assist power with respect to the variation of the steering torque can be reduced.

Figure 9:
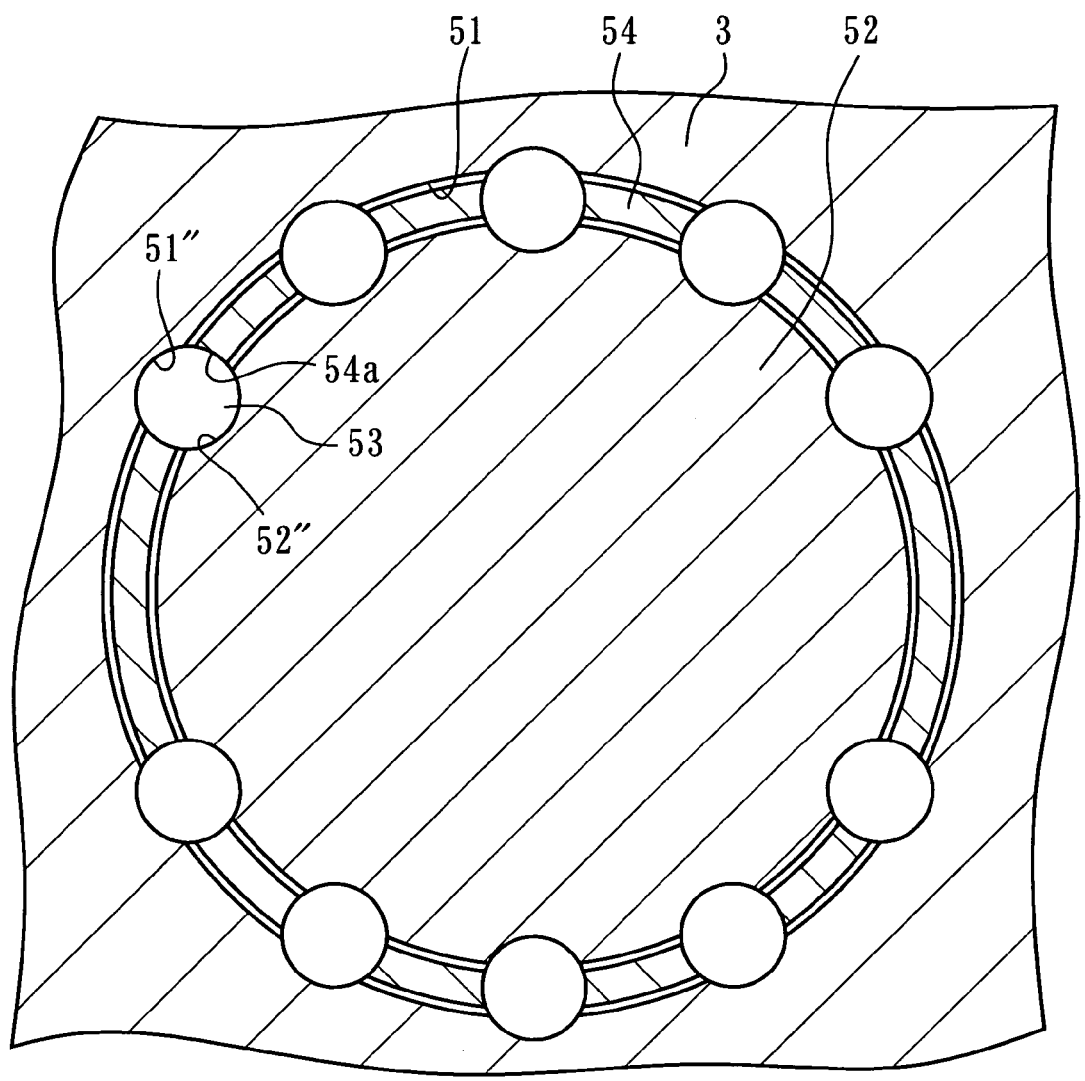
FIG. 9 is a front cross sectional view of an essential part of the restricting device in the hydraulic power steering apparatus of a second embodiment of the present invention.

FIG. 9 shows a second embodiment of the present invention. The difference from the first embodiment is that the inner raceway grooves 51" in the inner circumference of the guide bore 51 and the outer raceway grooves 52" in the outer circumference of the plunger 52 are formed in ten rows respectively, with spacing in the circumferential direction of the guide bore 51. The plural steel balls 53 are disposed in the raceway grooves 51" and 52". Therefore, each plunger 52 supported by the inner circumference of the raceway grooves 51" via the steel balls 53 can be prevented from tilting to its reciprocal movement direction, and the inner circumference of the guide bore 51 and the outer circumference of the plungers 52 certainly come into contact with the steel balls 53 without directly contacting with each other. Further, by increasing the number of the steel balls 53, the load on the inner circumference of the guide bore 51 contacting with each of the steel balls 53 can be reduced. Consequently, the surface treatment for hardening the inner circumference of the guide bore 51 can be simplified or eliminated, whereby increase of the cost can be prevented. The rest of the present embodiment is same as the first embodiment, thus the same parts are indicated by the same symbols. The inner raceway grooves 51" and the outer raceway grooves 52" can be made in any rows besides in two or ten rows, or alternatively, only the inner raceway grooves 51" or only the outer raceway grooves 52" can be formed.

Figure 10:
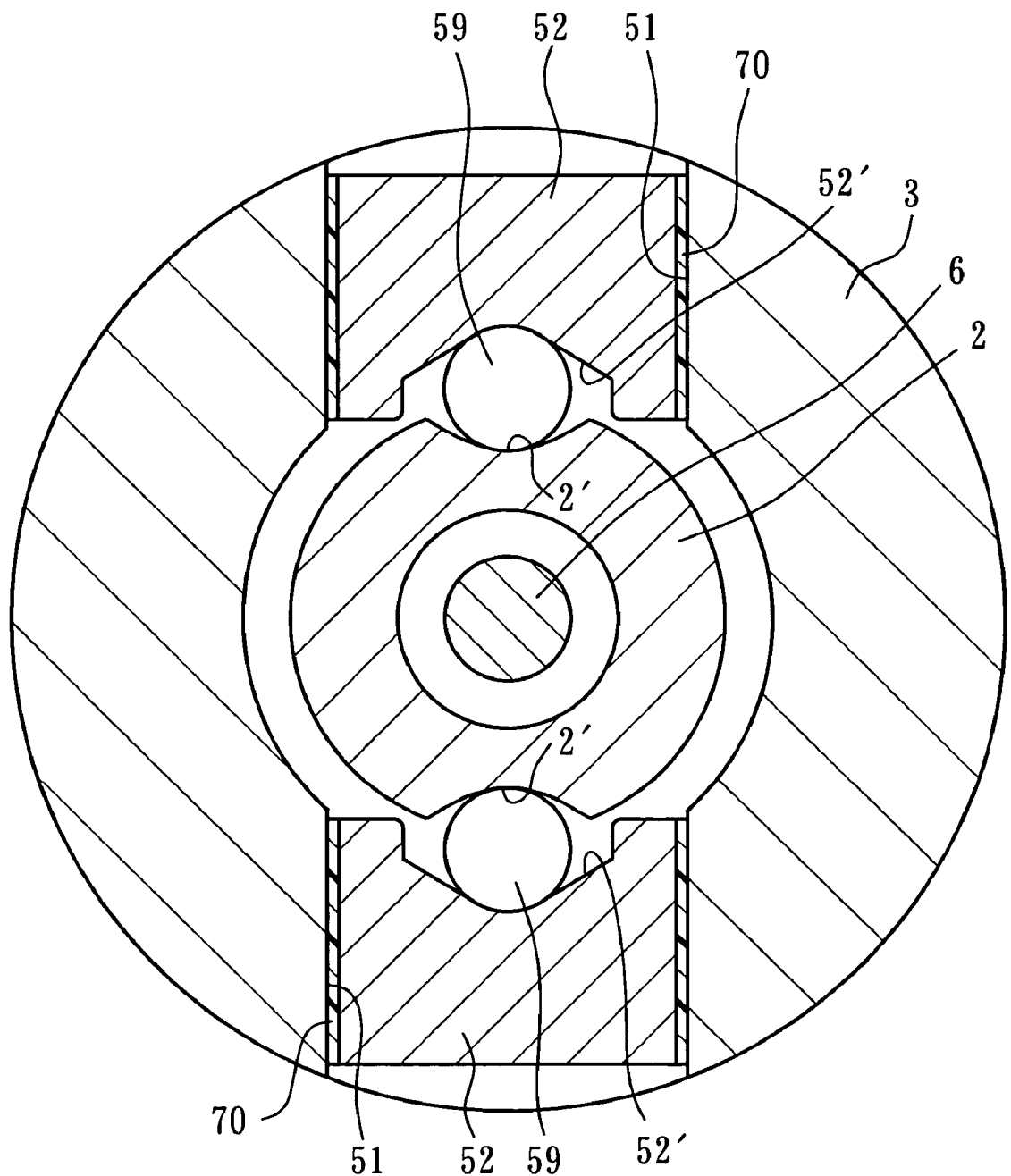
FIG. 10 is a plane cross sectional view of an essential part of the restricting device in the hydraulic power steering apparatus of a third embodiment of the present invention.

FIG. 10 shows a third embodiment. The difference from the first embodiment is that, instead of the steel balls 53, coating material 70 coated on the outer circumference of the plunger 52 is adopted as the friction reducing element, and thereby is interposed between the inner circumference of the guide bore 51 and the outer circumference of the plunger 52. The steel balls 53, raceway grooves 51", 52", and the retainer 54 are not provided. Synthetic resin materials such as polytetrafluoroethylene or molybdenum disulfide can be used as the coating material 70. A known method can be employed as a coating method for the coating material 70, for example, a dip coating method can be employed. The coating thickness is, for example, approximately 0.005 mm. By making the gap between the outer circumference of the coating material 70 and the inner circumference of the guide bore 51 be, for example, approximately 0.005 mm or less, the use of the oil seal 58 as in the first embodiment can be eliminated. Thus, the friction between the inner circumference of the guide bore 51 and the plunger 52 can be reduced more in comparison with the case where both directly contact to each other. Moreover, it takes less amount of work for assemble than the steel balls 53 are interposed, and also the amount of work for machining can be reduced since it is not necessary to machine the raceway grooves 51" and 52" for the steel balls 53. Furthermore, the load on the inner circumference of the guide bore 51 can be reduced, thus the surface treatment for hardening the inner circumference of the guide bore 51 can be simplified or eliminated. For example, by merely applying a work hardening process to the inner circumference of the guide bore 51, the heat treatment can be eliminated, whereby increase of the cost can be prevented. The rest of the present embodiment is same as the first embodiment. Alternatively, the inner circumference of the guide bore 51 can be coated with the coating material 70.

Figure 11:
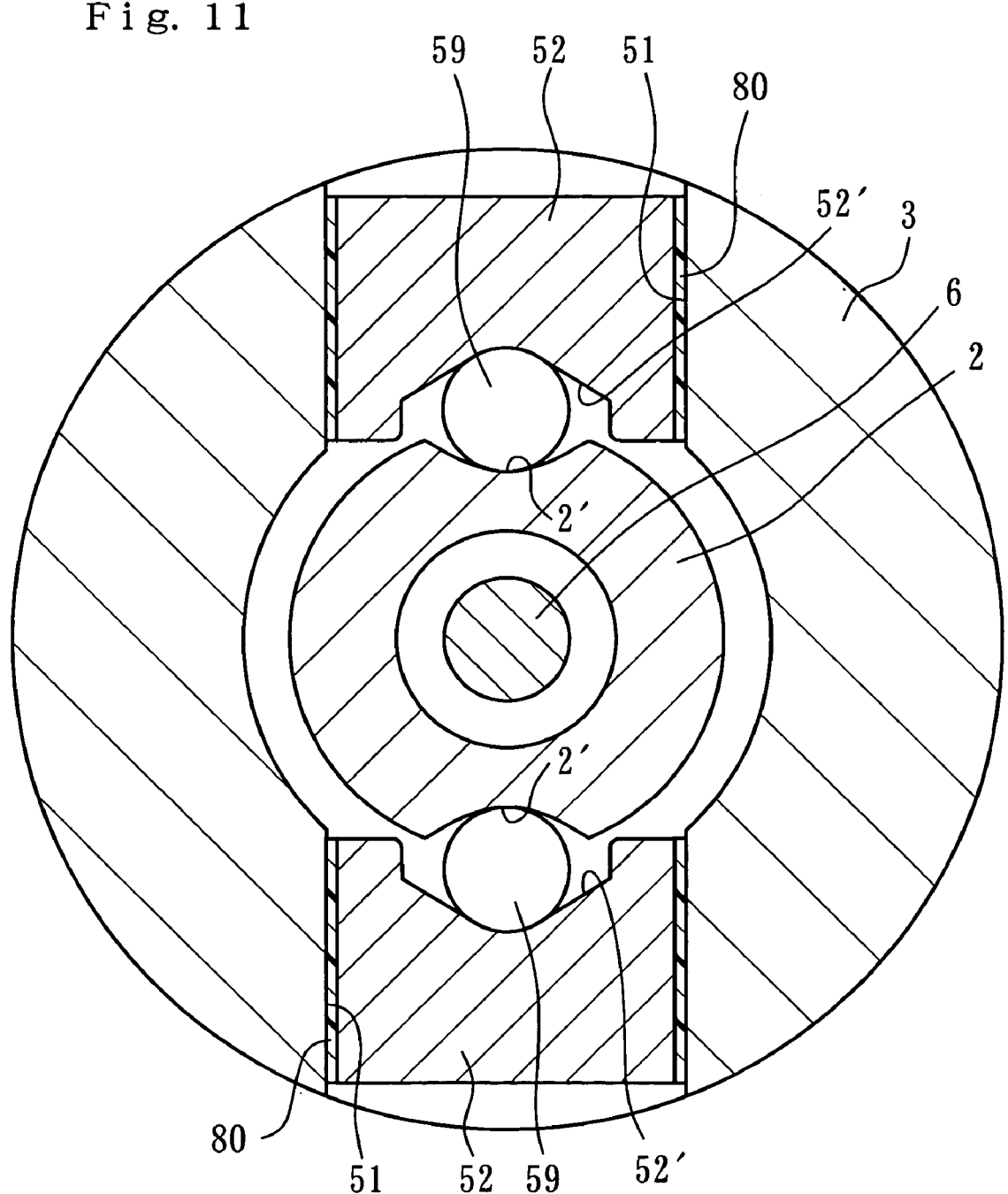
FIG. 11 is a plane cross sectional view of an essential part of the restricting device in the hydraulic power steering apparatus of a fourth embodiment of the present invention.
Figure 12:
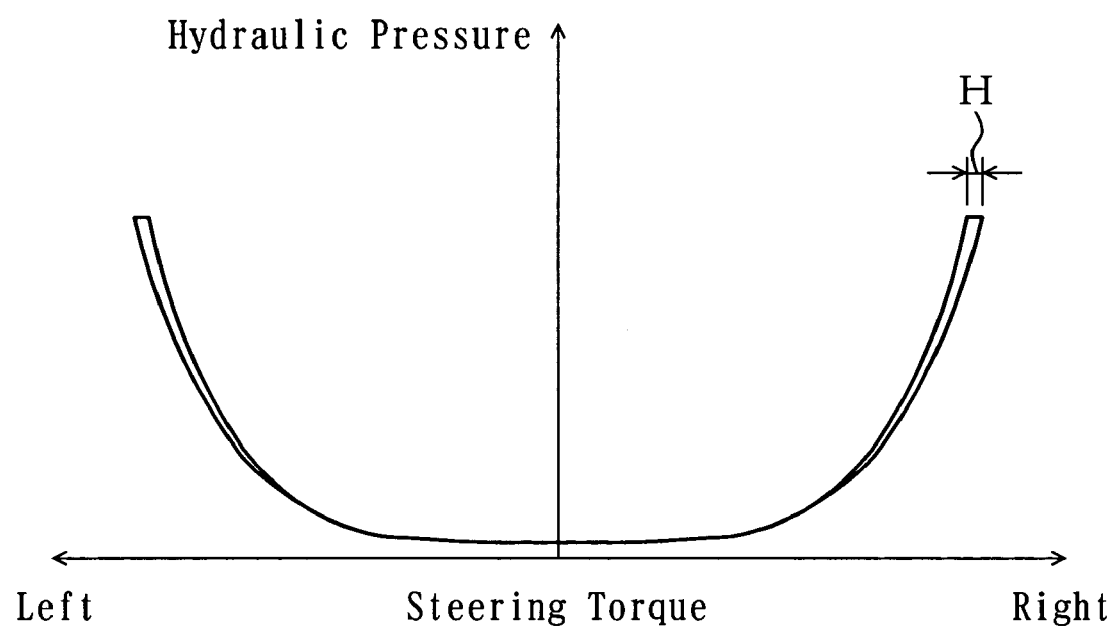
FIG. 12 is a diagram showing a relationship between the steering torque and hydraulic pressure of the oil for generating steering assist power of the hydraulic power steering apparatus of the present invention.
Figure 13:
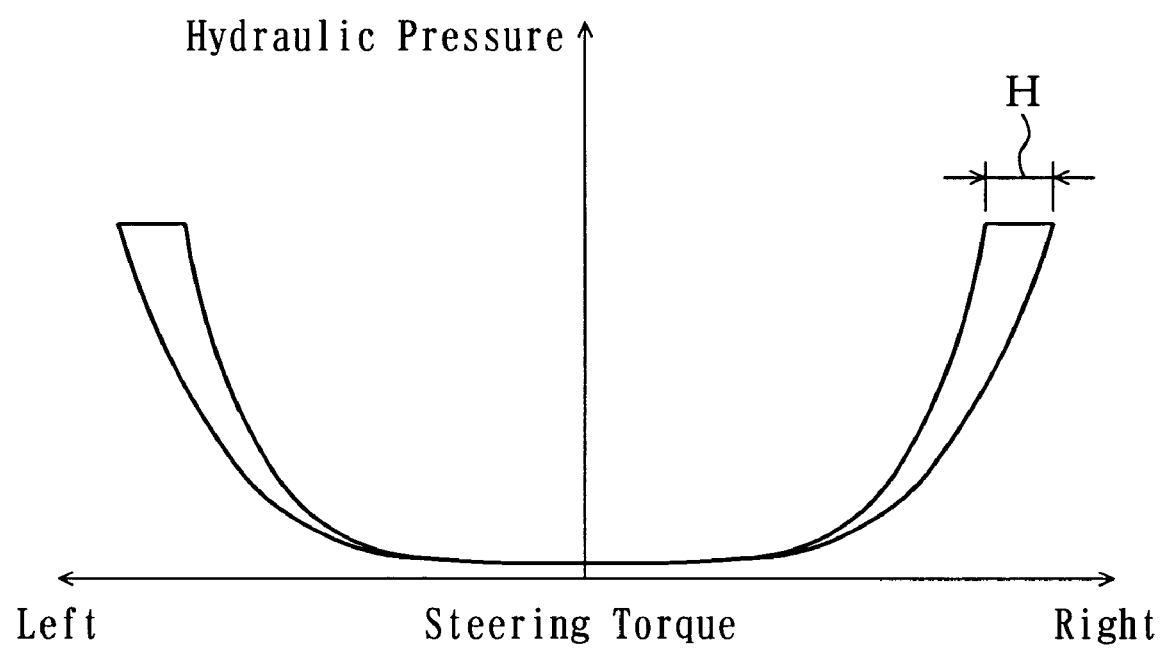
FIG. 13 is a diagram showing a relationship between the steering torque and hydraulic pressure of the oil for generating steering assist power of the conventional hydraulic power steering apparatus.

FIG. 11 shows a fourth embodiment of the present invention. The difference from the first embodiment is that, instead of the steel balls 53, cylindrical member 80 pressed into the outer circumference of the plunger 52 is adopted as the friction reducing element, and thereby is interposed between the inner circumference of the guide bore 51 and the outer circumference of the plunger 52. The steel balls 53, raceway grooves 51", 52", and the retainer 54 are not provided. A tube made of synthetic resin materials, such as polytetrafluoroethylene, can be used as the cylindrical member 80. The thickness of the cylindrical member 80 is approximately 1.0 mm. By making the gap between the outer circumference of the cylindrical member 80 and the inner circumference of the guide bore 51 be, for example, approximately 0.005 mm or less, the use of the oil seal 58 as in the first embodiment can be eliminated. Therefore, the same functions and effects as those in the third embodiment can be achieved. The rest of the present embodiment is same as the first embodiment, thus the same parts are indicated by the same symbols. Alternatively, the cylindrical member 80 can be pressed into the inner circumference of the guide bore 51.

The present invention is not limited to the above embodiments. For example, although the number of the guide bores and the plungers are two in the above embodiments, the number thereof is not particularly limited. Further, as illustrated in FIG. 5, the guide bores 51 can be formed in the input shaft (2) to activate the hydraulic pressure for pressing the output shaft (3) via the plunger 51. The pressing members 59 as in the above embodiment are inessential, thus the plungers can directly press the input shaft or the output shaft. The hydraulic pressure can be adjusted by the hydraulic pressure adjustment mechanism in accordance with, for example, the rudder angle as a driving condition of the vehicle rather than the vehicle speed. The present invention can be applied to a hydraulic power steering apparatus of a type besides the rack and pinion type, for example, the present invention can be applied to a ball screw type hydraulic power steering apparatus where an output shaft is integrated with a ball screw shaft.

What is claimed is:

1. A hydraulic power steering apparatus, comprising:
   an input shaft;
   an output shaft connected to said input shaft so as to be capable of elastic relative rotation in accordance with steering torque;
   a hydraulic actuator for generating steering assist power;
   a control valve for controlling hydraulic pressure of oil supplied to said hydraulic actuator in accordance with the amount of relative rotation between said input shaft and said output shaft;

a restricting device for restricting the relative rotation between said input shaft and said output shaft in accordance with a driving condition of a vehicle;

said restricting device having a guide bore formed in one of said input shaft and said output shaft, a plunger inserted into said guide bore so as to be capable of reciprocal movement toward the direction in which the plunger approaches to and goes away from the other of said input shaft and said output shaft, and a hydraulic pressure adjustment mechanism for adjusting hydraulic pressure for pressing the other of said input shaft and said output shaft via said plunger in accordance with said driving condition of the vehicle; and said plunger being guided by the inner circumference of said guide bore to the reciprocal movement direction when said input shaft and said output shaft rotate relatively;

wherein a friction reducing element is interposed between the inner circumference of said guide bore and the outer circumference of said plunger;

wherein said friction reducing element is spheres rolling between the inner circumference of said guide bore and the outer circumference of said plunger; and wherein, in at least one of the inner circumference of said guide bore and the outer circumference of said plunger, three or more rows of raceway grooves are formed along the reciprocal movement direction of said plunger, with spacing in the circumferential direction of said guide bore, and said spheres are disposed in each of said raceway grooves.

2. A hydraulic power steering apparatus, comprising:

an input shaft;

an output shaft connected to said input shaft so as to be capable of elastic relative rotation in accordance with steering torque;

a hydraulic actuator for generating steering assist power;

a control valve for controlling hydraulic pressure of oil supplied to said hydraulic actuator in accordance with the amount of relative rotation between said input shaft and said output shaft;

a restricting device for restricting the relative rotation between said input shaft and said output shaft in accordance with a driving condition of a vehicle;

said restricting device including:
  a guide bore formed in one of said input and output shafts;
  a plunger inserted into said guide bore and pressed against another of said input and output shafts;
  said plunger being capable of reciprocal movement in said guide bore, towards and away from said other of said input and output shafts;
  reciprocal movement of said plunger being guided by an inner circumference of said guide bore when said input shaft and said output shaft rotate relatively;
  a hydraulic pressure adjustment mechanism adjusting hydraulic pressure for pressing the plunger against said input shaft so that relative motion between said input and output shafts is restricted; and a friction reducing element being interposed between the inner circumference of said guide bore and the outer circumference of said plunger; and said friction reducing element comprises spheres circumferential rolling between the inner circumference of said guide bore and the outer circumference of said plunger, said spheres being maintained at a predetermined axial position along said power steering apparatus.

* * * * *